(12) United States Patent
Bauer et al.

(10) Patent No.: US 10,643,140 B2
(45) Date of Patent: May 5, 2020

(54) METHOD, SYSTEM AND COMPUTER PROGRAM PRODUCT FOR AUTOMATING EXPERTISE MANAGEMENT USING SOCIAL AND ENTERPRISE DATA

(71) Applicant: International Business Machines Corporation, Armonk, NY (US)

(72) Inventors: John H. Bauer, Woodstock, IL (US); Dongping Fang, Naperville, IL (US); Aleksandra Mojsilovic, New York, NY (US); Karthikeyan N. Ramamurthy, Ossining, NY (US); Kush R. Varshney, Ossining, NY (US); Jun Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 14/266,970

(22) Filed: May 1, 2014

(65) Prior Publication Data

US 2015/0317376 A1 Nov. 5, 2015

(51) Int. Cl.
*G06N 5/02* (2006.01)
*G06Q 10/06* (2012.01)
(Continued)

(52) U.S. Cl.
CPC .......... *G06N 7/005* (2013.01); *G06F 16/285* (2019.01); *G06F 16/9024* (2019.01); *G06N 5/02* (2013.01); *G06Q 10/06* (2013.01); *G06Q 10/105* (2013.01)

(58) Field of Classification Search
None
See application file for complete search history.

(56) References Cited

U.S. PATENT DOCUMENTS

| | | | |
|---|---|---|---|
| 6,456,982 B1* | 9/2002 | Pilipovic | G06Q 40/00 705/1.1 |
| 8,161,048 B2* | 4/2012 | Procopiuc | G06F 16/22 707/737 |

(Continued)

FOREIGN PATENT DOCUMENTS

WO 2013049698 A2 4/2013

OTHER PUBLICATIONS

Lappas et al., "A Survey of Algorithms and Systems for Expert Location in Social Networks," In C. C. Aggarwal (ed.), Social Network Data Analytics, pp. 215-241, Springer, 2011.*

(Continued)

*Primary Examiner* — Alexey Shmatov
*Assistant Examiner* — Fen Christopher Tamulonis
(74) *Attorney, Agent, or Firm* — Harrington & Smith

(57) ABSTRACT

A method includes performing contextual association of entities using multi-source data. For each context the method performs co-clustering to identify distinct expert-skill associations; constructing single-entity unipartite graph representations and performing a random walk within each single-entity unipartite graph; for each single-entity unipartite graph, obtaining steady state distributions using the random walks to obtain clusters of experts and skills; performing a weighted two-way random walk across entity graphs (graph edges), giving preference to traversal within members of the same co-cluster; and performing link prediction for each context by dynamically adding edges, and obtaining overall skills predictions, analyses and inferences by merging the contexts and weighting the links of each context. The method can also use the context-specific weights obtained from the co-association information in a matrix completion procedure, and finally merge the context-specific outputs to obtain overall skills predictions, analyses (Continued)

and inferences. A computer program product and a system are also disclosed for performing the method.

21 Claims, 9 Drawing Sheets

(51) Int. Cl.
| | | |
|---|---|---|
| *G06N 7/00* | (2006.01) | |
| *G06F 16/28* | (2019.01) | |
| *G06F 16/901* | (2019.01) | |
| *G06Q 10/10* | (2012.01) | |

(56) References Cited

U.S. PATENT DOCUMENTS

| | | | |
|---|---|---|---|
| 2005/0154701 A1* | 7/2005 | Parunak | G06F 17/30705 |
| 2006/0229896 A1 | 10/2006 | Rosen et al. | |
| 2008/0208671 A1 | 8/2008 | Ehrlich et al. | |
| 2008/0243575 A1 | 10/2008 | Weinberger | |
| 2009/0030927 A1 | 1/2009 | Cases et al. | |
| 2012/0154219 A1* | 6/2012 | Snoussi | G01S 5/0252 |
| | | | 342/386 |
| 2012/0232884 A1* | 9/2012 | Nasukawa | G06F 17/2809 |
| | | | 704/8 |
| 2013/0046769 A1* | 2/2013 | He | G06F 17/30958 |
| | | | 707/748 |
| 2013/0218619 A1 | 8/2013 | Friedlander et al. | |
| 2014/0204092 A1* | 7/2014 | Bertozzi | G06K 9/6224 |
| | | | 345/440 |
| 2014/0207385 A1* | 7/2014 | Martin | G06F 19/12 |
| | | | 702/19 |
| 2014/0304249 A1* | 10/2014 | Ayzenshtat | G06F 17/3053 |
| | | | 707/709 |
| 2014/0317038 A1* | 10/2014 | Mojsilovic | G06Q 10/00 |
| | | | 706/46 |
| 2015/0317376 A1* | 11/2015 | Bauer | G06F 17/30958 |
| | | | 707/737 |
| 2016/0170996 A1* | 6/2016 | Frank | G06F 17/30702 |
| | | | 707/748 |

OTHER PUBLICATIONS

Wang et al., "Legislative prediction via random walks over a heterogeneous graph," Proceedings of the SIAM International Conference on Data Mining, pp. 1096-1106, SIAM, 2012.*

Tong et al., "Fast Random Walk with Restart and Its Applications," Proceeding ICDM '06 Proceedings of the Sixth International Conference on Data Mining, pp. 613-622, Dec. 18-22, 2006.*

Zhang et al., "Random Walks on Weighted Networks," arxiv.org, Dec. 27, 2017.*

Jiang et al. "Social Recommendation Across Multiple Relational Domains" CIKM'12 [Published 2012] [Retrieved Online Dec. 2019] <URL:https://dl.acm.org/citation.cfm?id=2396761.2398448> (Year: 2012).*

Farhadi et al. "TeamFinder: A Co-clustering based Framework for Finding an effective team of Experts . . . " ICDMW'2012 [Published 2012] [Retrieved online Dec. 2019] <URL: https://ieeexplore.ieee.org/document/6406430> (Year: 2012).*

Dhillon, I. "Co-Clustering Documents and Words Using Bipartite Spectral Graph Partitioning", ACM 2001 15113-391.

Banerjee et al., "A Generalized Maximum Entropy Approach to Bregman Co-Clustering and Matrix Approximation", Research Track Poster, 2004 ACM 1-58113-888.

Koren et al., "Matrix Factorization Techniques for Recommender Systems", Published by the IEEE Computer Society, Computer, 2009.

Varshney et al., "Predicting and Recommending Skills in the Social Enterprise", 2013 Association for the Advancement of Artificial Intelligence.

Wang et al., "Legislative Prediction via Random Walks Over a Heterogeneous Graph", Proceedings of the 2012 Siam International Conference on Data Mining, Anaheim, CA, Apr. 26-28, 2012.

"Co-clustering Software (Version 1.1)", http://www.cs.utexas.edu/users/dml/Software/cocluster.html.

* cited by examiner

FIG. 8

$$p^{(c)}_{(es)_{ln}} = \gamma \sum_m h^{(c)}_{(e)_{lm|n}} r_{(e)_{lm}} p^{(c)}_{(es)_{mn}} + (1-\gamma) \sum_k p^{(c)}_{(es)_{lk}} h^{(c)}_{(s)_{kn|l}} r_{(s)_{kn}}$$

FIG. 10A

$$I(e_l, s_n) \approx p^{(c)}_{ln} \log \frac{p^{(c)}_{ln}}{p^{(c)}_{(e)_l} p^{(c)}_{(s)_n}}$$

FIG. 10B

$$(l^*, n^*) = \arg \max_{(l,n)} I(e_l, s_n)$$

FIG. 10C

$$\min_{a^{(c)*}, b^{(c)*}} \sum_{(l,n)} h^{(c)}_{(es)_{ln}} (w_{(es)_{ln}} - a^{(c)\tau} b^{(c)})^2 + \lambda(\|a^{(c)}\|_2^2 + \|b^{(c)}\|_2^2)$$

FIG. 10D

$$w^*_{(es)_{ln}} = \sum_c \tau^{(c)} a^{(c)*\tau} b^{(c)*}$$

FIG. 10E

METHOD, SYSTEM AND COMPUTER PROGRAM PRODUCT FOR AUTOMATING EXPERTISE MANAGEMENT USING SOCIAL AND ENTERPRISE DATA

TECHNICAL FIELD

The embodiments of this invention relate generally to methods, systems and computer programs that provide for the automation of expertise management of a group or groups of persons.

BACKGROUND

Assessing and managing the expertise of employees and others in, for example, the knowledge and service industries is important at least for the reason that human capital can be a key differentiator among various organizations and enterprises. The management of this human expertise can be fundamental for performing, as examples, workforce planning, skills inventory, the identification of specific persons for assignment to projects, individual skill gap assessment, identifying learning, recruiting and for sub-contracting procurement. It is critical to capture and understand the individual specialties of persons associated with an enterprise, whether these persons are employees of or otherwise affiliated with the enterprise, in order to achieve successful human capital management and operation.

As can be appreciated the larger the enterprise the more challenging these tasks become and the more important it is to provide methodologies and tools to automate the expertise and human capital management process.

SUMMARY

In a first aspect thereof the embodiments of this invention provide a method implemented at least partially using a computer. The method comprises performing contextual association of entities using multi-source data and for each context performing co-clustering to identify distinct expert-skill associations; constructing single-entity unipartite graph representations and performing a random walk within each single-entity unipartite graph; for each single-entity unipartite graph, obtaining steady state distributions using the random walks to obtain clusters of experts and skills; performing a weighted two-way random walk across entity graphs (graph edges), giving preference to traversal within members of the same co-cluster; and performing link prediction for each context by dynamically adding edges, and obtaining overall skills predictions, analyses and inferences by merging the contexts and weighting the links of each context.

In another aspect thereof the embodiments of this invention provide a computer program product comprised of software instructions on a computer-readable medium. Execution of the software instructions using a computer results in performing operations that comprise performing contextual association of entities using multi-source data and for each context performing co-clustering to identify distinct expert-skill associations; constructing single-entity unipartite graph representations and performing a random walk within each single-entity unipartite graph; for each single-entity unipartite graph, obtaining steady state distributions using the random walks to obtain clusters of experts and skills; performing a weighted two-way random walk across entity graphs (graph edges), giving preference to traversal within members of the same co-cluster; and performing link prediction for each context by dynamically adding edges, and obtaining overall skills predictions, analyses and inferences by merging the contexts and weighting the links of each context.

In a further aspect thereof the embodiments of this invention provide a system that comprises at least one data processor connected with at least one memory that stores software instructions. Execution of the software instructions by the at least one data processor causes the system to perform contextual association of entities using multi-source data and, for each context, perform co-clustering to identify distinct expert-skill associations; to construct single-entity unipartite graph representations and perform a random walk within each single-entity unipartite graph; for each single-entity unipartite graph, to obtain steady state distributions using the random walks to obtain clusters of experts and skills; to perform a weighted two-way random walk across entity graphs (graph edges), giving preference to traversal within members of the same co-cluster; and to perform link prediction for each context by dynamically adding edges, and obtain overall skills predictions, analyses and inferences by merging the contexts and weighting the links of each context.

In yet another aspect thereof the embodiments of this invention provide a method implemented at least partially using a computer, the method comprising performing contextual association of entities using multi-source data and for each context performing co-clustering to identify distinct expert-skill associations. The method further includes performing a matrix completion procedure where weights for each context are obtained using co-association information.

BRIEF DESCRIPTION OF THE SEVERAL VIEWS OF THE DRAWINGS

FIG. 8 illustrates a third use case example related to finding experts based on expertise area, keyword or topic with context filtering.

FIGS. 10A-10C show an equations that can be employed for a random two-way walk procedure, while FIGS. 10D-10E show equations that can be employed during a matrix completion embodiment of this invention.

DETAILED DESCRIPTION

Figure 1:
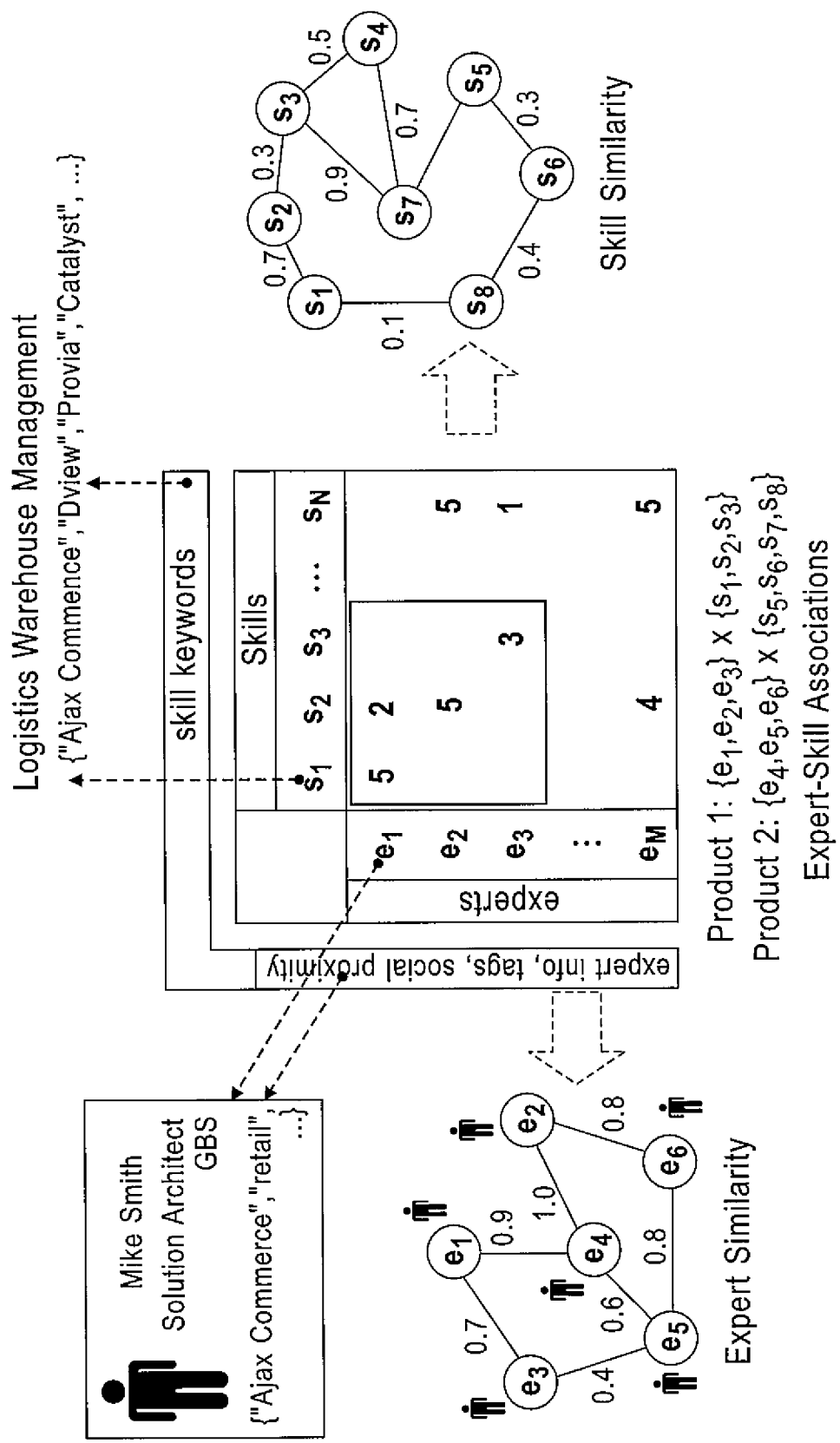
FIG. 1 presents a high level of an overview of an approach to expertise management made possible by the use of this invention

The ensuing description is made at least partially in the context of "organizations", "enterprises" and "employees".

As discussed herein an "organization" can be generally considered to be an organized body of people with a particular purpose including, for example, a business, a society, an administration, or an association. Examples of an organization include a company, a firm, a corporation, an institution, a group, an agency, or a consortium. An "enterprise" can be generally considered herein to be any type of organization including, as non-limiting examples, a for-profit organization, a not-for-profit organization, or a governmental agency. An "employee" can be generally considered herein to be any person who can be affiliated in some manner with an organization or an enterprise such as a salaried employee, a non-salaried employee, an external contractor, or a volunteer.

One conventional approach to expertise management is to categorize employees by various criteria, such as by using organization charts, business units, geological locations, report chains, and so on. All of these conventional approaches can be considered as being based on a taxonomy, i.e., on some hierarchical classification of entities of interest to an organization.

A relatively recent technique allows for a crowd-sourced solution, where members of an organization or a network are tagged in free form according to their expertise. This can be considered as a "folksonomy" approach. For example, various expertise categories can be defined, e.g., 'Helpdesk', 'System Integration', 'Machine Learning', and those employees having expertise in one or more of these categories are associated by skills and expertise tags with each relevant category.

While taxonomical classification is well-defined and easily interpretable it can have scalability issues and can become too rigid and cumbersome to manage. This is particularly true when skills and job roles evolve rapidly, since frequently changing taxonomies can be expensive to the organization and confusing to users. As an example, skills of some certain employee moving across the organization may not be easily mapped to job roles, resulting in creating orphan skills.

One further issue with taxonomical classification relates to the fact that existing human resource (HR) management tools are limited in understanding an employee's skill set in both scalability and depth. This is true at least for the reason that it is generally difficult to characterize employees by the specific functions they carry out or by the knowledge they have. Manual processing cannot handle a large scale workforce with a complex skill/expertise taxonomy (e.g., some enterprises can have tens or hundreds of thousands of employees having thousands or tens of thousands of skills).

The folksonomical classification approach is more scalable and more easily managed, but it can be difficult to interpret and can also be unreliable since this approach relies heavily on free annotation and endorsement. As an example, a certain employee's personal trainer could endorse the employee as an optimization expert, i.e., could endorse the employee as having some certain skill set that is unfamiliar to the person who is making the endorsement.

The embodiments of this invention overcome these difficulties by providing in one aspect thereof a hybrid approach that extracts information on-demand by using machine learning models that exploit any taxonomical information available in the organization as well as folksonomical information obtained using social data (e.g., data obtained from social media).

In accordance with aspects of this invention a methodology is provided to understand employee expertise from multiple perspectives, to automatically tag employees (people) with skills and expertise, to maintain a dynamic inventory of the skills of employees and to understand fully the dimensions of expertise contained in both social and enterprise data.

The various data sources used for the expertise analytics can include, but need not be limited to, conventional human resource data: e.g., organization, business unit, reporting structure, and so on; social data: e.g., recorded social activities such as wiki, microblogs, and other enterprise social network(s); enterprise data: e.g., product information, technical documentation, enterprise and public presentations and publications, and enterprise knowledge gate(s).

Associated with a given employee are skills assessed to the employee, e.g., 'Advise Data Warehousing', 'Apply SQL Programming Knowledge', 'Develop Solutions Utilizing Applications and/or Architectures', etc. Associated with the given employee are also skills and other traits derived from social tags that can be obtained from both enterprise social network(s) and public social network(s). Other skill sources can also be considered such as, for example, an indication of experience with energy policy and/or utilities, banking and/or financial, or retail and/or business analytics and optimization (BAO).

There are a number of different usage cases for the expertise analytics provided by this invention. For example there is an ability to predict and track skills/expertise of an individual employee. This can entail automated expertise assessments such as a message sent to an employee "Mike, have you considered adding BAO and Predictive Analytics to your profile?" This can also entail automated expertise endorsements such as "Mike, would you like to endorse Mary on her Predictive Analytics expertise?" This can also entail an automated skill gap/glut analysis such as "How many Predictive Analytics experts we have in Europe?" This can also entail an ability to find experts with a particular skill or topic based on a context, e.g.: "Find all experts in Enterprise Marketing who have also worked on SPSS." This can also entail an ability to find experts using natural keywords based on a context, e.g.: "Can you find an expert in big data analytics who work in the healthcare domain?". This can also entail an ability to automatically assess an employee population on a new skill (outside taxonomy) such as "We are launching Smarter Workforce solutions ("HR analytics"), how many experts we have in this area?" This can also entail an ability to find similar experts, e.g.: "Help me find more experts like Mike Smith III".

At least one conventional skill recommendation and endorsement approach involves a professional social network approach that is based on a naive Bayesian model where the skill likelihood is a conditional model, e.g., p(skill|profile)=p(skill|industry, company, title . . . ). The probabilities are then combined using a naive Bayes classifier:

$$p(C|F_1, \ldots, F_n) = (p(C)p(F_1, \ldots, F_n|C))/p(F_1, \ldots, F_n) = (p(C)p(F_1|C) \ldots P(F_n|C))/p(F_1, \ldots, F_n).$$

This approach is however based on problematic assumptions and limited data sources, where professional profiles are the key data.

A high level overview of the approach of this invention is shown in FIG. 1. Given expertise data (e.g., skills, taxonomy), social data, enterprise information (e.g., business card, CV), and expert-skill associations (e.g., products, industry) the method estimates the most likely skills and areas of expertise for the employee population.

This approach is thus not based on simple skill prediction and a recommendation interface since it combines various sources of enterprise and social data including, but not limited to, organizational taxonomy, social data and contextual information. This approach can perform various levels of prediction and inference. For example, the use of this invention can answer a simple question such as: "Can you find an expert in BAO?" and can also respond to a more complex query such as: "Identify a shortlist of people who can head the Optimization Research Team. The person must have a wide cross-product experience, and also must have good experience in customer interfacing." In that the approach provided by this invention is based on sound machine learning strategies it can efficiently handle a rapidly changing organizational structure and also social data.

In the undirected graphs of FIG. 1 the link weights denote the similarities between the experts or the skills. For each expert a feature can be derived using their social connections, similarities with respect to an organizational unit, etc. Similarly for each skill, a representative feature can be obtained based on its description, placement in the taxonomy, etc. These features can be then used to compute the similarities which are also the link weights. Therefore, a link weight of, e.g., 0.9 implies that the similarity between the two entities connected by the link is higher than the similarity of two entities connected with link weight of, e.g., 0.4.

Figure 2:
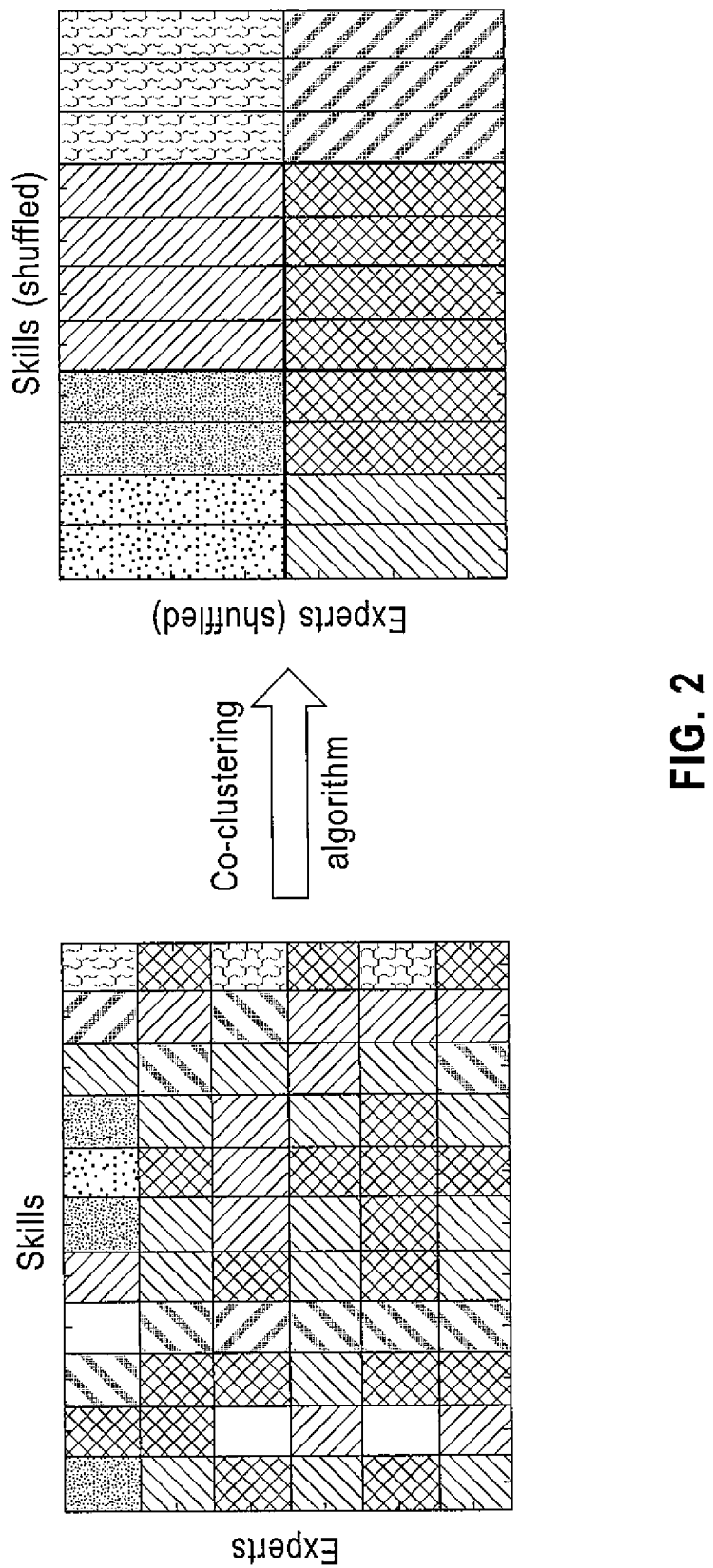
FIG. 2 illustrates an expert-skill approach that uses co-clustering in accordance with aspects of this invention.

FIG. 2 illustrates the co-clustering of an expert-skill in accordance with aspects of this invention. Typically the expert-skill matrix shown on the left side of FIG. 2 is very sparse since intuitively any expert can typically be a master of only a small subset of skills. Predicting and analyzing entries (links) in such a sparse matrix can be greatly aided by additional contextual association information.

EXAMPLE 1

Experts $e_1$, $e_2$ and $e_3$ worked together in developing a product $p_1$, using skills $s_1$, $s_2$ and $s_3$. This defines a natural co-cluster between the experts and skills in the product context, and this can be directly coded using a matrix.

EXAMPLE 2

Figure 3A:
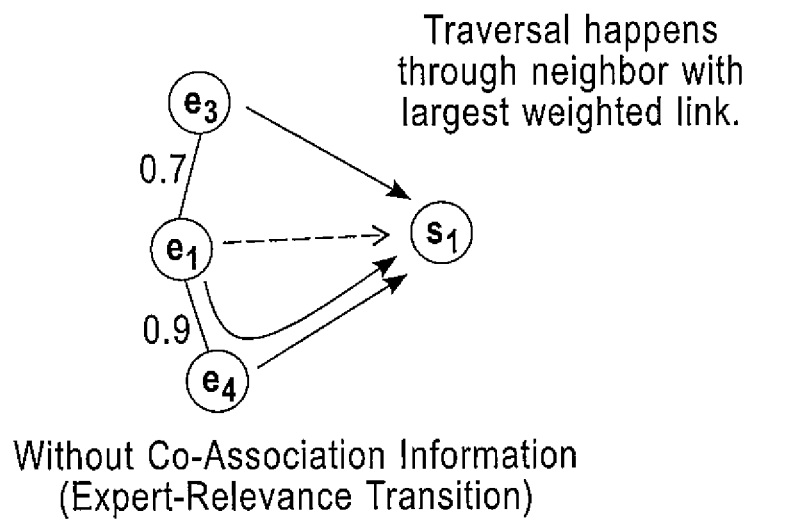
FIGS. 3A and 3B, collectively referred to herein as FIG. 3, illustrate link prediction without the use of co-association information (FIG. 3A) and with the use of co-association information (FIG. 3B).

A set of six experts worked together in developing three white papers that have direct or indirect associations to their 11 skills. The association information is not directly coded but is instead inferred by extracting relevant features from the white papers (e.g., keywords) and co-clustering the extracted relevant features. This defines a derived co-cluster between the experts and skills FIG. 3 illustrates link prediction with co-association information. Without co-association, shown in FIG. 3A in the upper portion of FIG. 3, link prediction between an expert $e_i$ and a skill $s_j$ involves either:

traversal using expert-relevance ($e_i$-$e_l$->$s_j$), or
traversal using skill-relevance ($e_i$->$s_m$-$s_j$).

Note that the traversal occurs through the neighbor node with the largest weighted link.

Figure 3B:
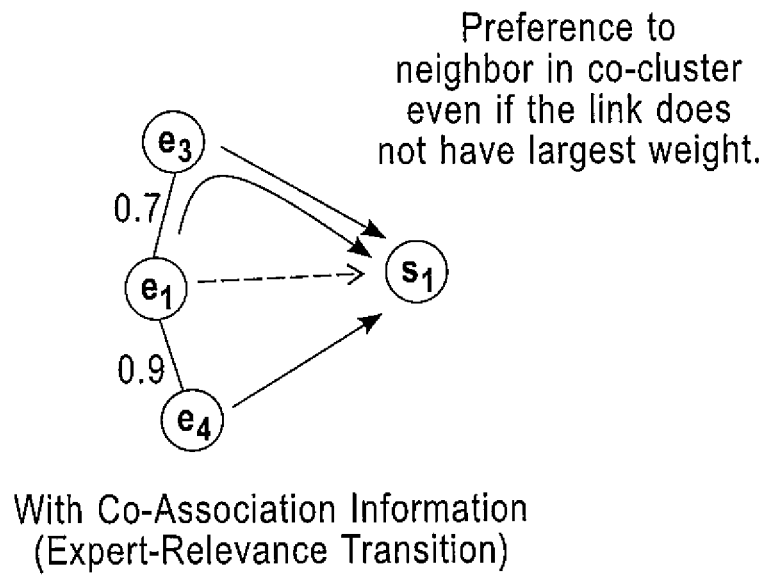

With co-association, shown in FIG. 3B in the lower portion of FIG. 3, link prediction between an expert $e_i$ and a skill $s_j$ involves either:

expert-relevance ($e_i$-$e_l$->$s_j$) traversal with preference through co-clustered nodes, or.
skill-relevance ($e_i$->$s_m$-$s_j$) traversal with preference through co-clustered nodes.

Note in this case that the preference is to the neighbor node in the co-cluster even if the link does not have the largest weight.

Figure 4:
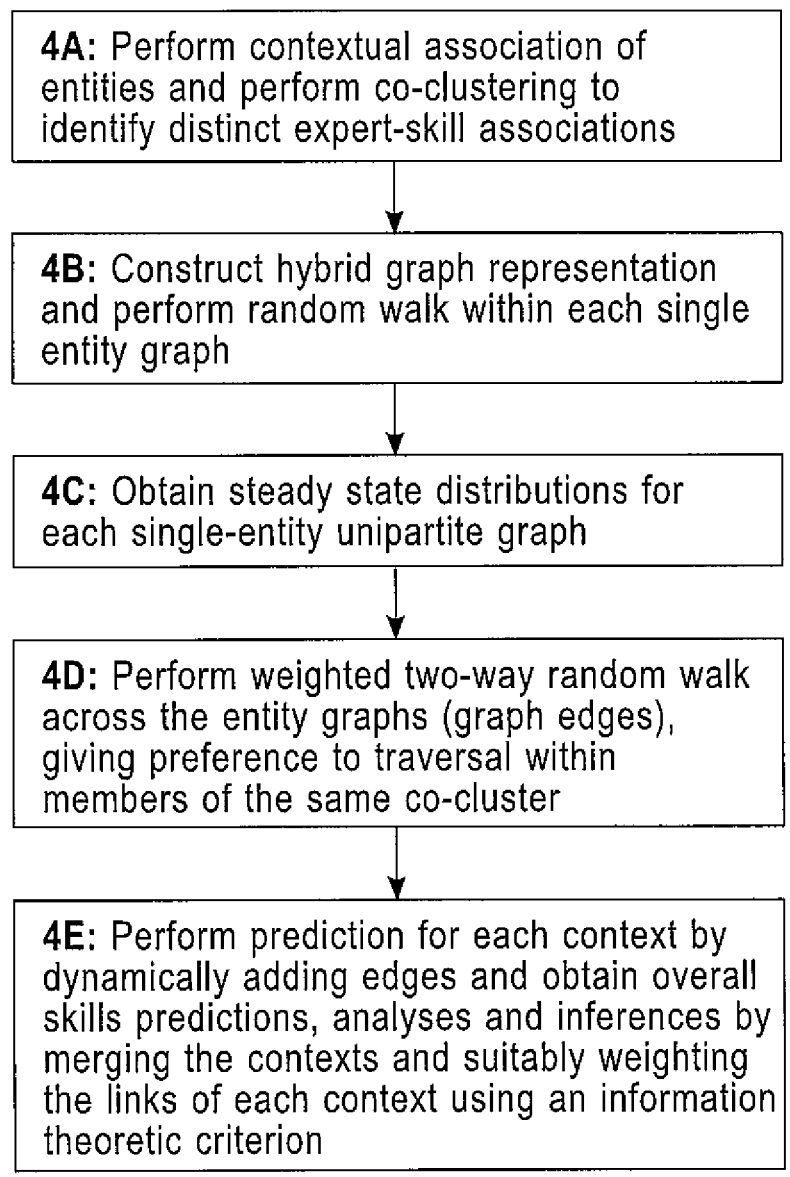
FIG. 4 is a logic flow diagram that summarizes steps of a method in accordance with embodiments of this invention.
Figure 5:
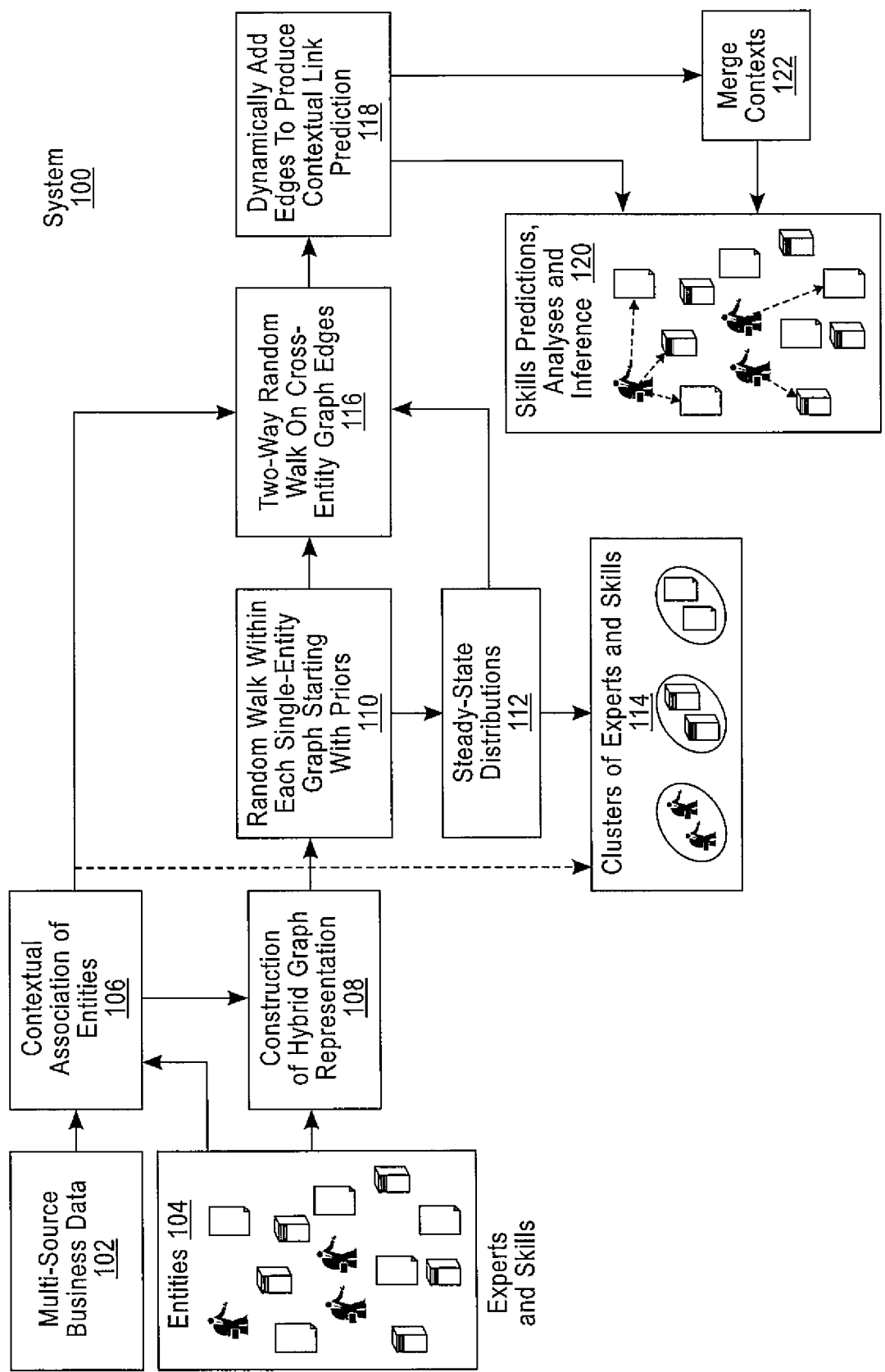
FIG. 5 is a diagram depicting a skill prediction and recommendation system and methodology in accordance with aspects of this invention.

The steps involved in this process can be summarized as follows (reference can be made to the logic flow diagram shown in FIG. 4 as well as to the diagram depicting a system 100 in FIG. 5).

4A. Beginning with multi-source business data 102, such as taxonomical classification data and folksonomical data, as well as other data sources including publications, records of prior collaborations and so forth, that relates to entities 104 (representing experts and their skills), a contextual association of the entities is performed at 106. This process explores expert-skill associations in different contexts. For each context (e.g., product, industry, white papers), the method performs co-clustering to identify distinct expert-skill associations. The individual associations can be either combined to obtain a summary co-cluster or they can be used independently.

4B. In block 108 a hybrid graph representation is constructed and in block 110 a random walk within each single entity graph, starting with priors, is performed. This involves modeling the expert similarity and the skill similarity as unipartite (undirected) graphs, where the nodes (vertices) denote the experts or skills and the edges denote their respective relations. The relation between experts and skills is modeled as a directed graph. This step involves a predictive and descriptive analysis via the random walk over heterogeneous graphs with augmented co-association information between the nodes of the single-entity graphs.

For the undirected graph, the prior probability of each node indicates an initial belief on the possibility of the node being a part of a link. For example, if the prior probability is higher, it means that there is a strong belief that the node will be connected to many other nodes. In the expert graph this may correspond, for example, to people who are thought to be leaders in many areas. FIG. 1 thus shows the undirected graph and FIG. 2 can be considered to be an initial directed graph of relations between experts and skills as defined by several contexts. However, this initial directed graph will be refined in accordance with aspects of this invention using the algorithm depicted in FIG. 4.

4C. For each single-entity unipartite graph, steady state distributions are obtained at block 112 using the random walks resulting in obtaining clusters of experts and skill 114.

4D. At block 116 a weighted two-way random walk is performed across the entity graphs (graph edges), giving preference to traversal within members of the same co-cluster.

Describing this step of the method now in greater detail, in order to implement the weighted two-way random walk one first computes the context-specific weights, which are the preferences for the experts or skills belonging to the same co-cluster. One exemplary implementation of this sub-step of the method can be as follows.

Computing the weights: Assume that the algorithm needs to predict the strength of a link between the expert e1 and the skill s1, and wishes to transition through the expert e2. The weight here corresponds to the probability that e1 and e2 belong to the same co-cluster as s1. This can be obtained as an output of the co-clustering algorithm.

Weighted two way random walk:

As an overview of an implementation using weighted two-way random walks, assume that the unipartite expert graph is denoted by $G_{(e)}$ and the unipartite skill graph is indicated by $G_{(s)}$. The number of experts is N and the number of skills is L. Considering only the expert graph, $w_{(e)lm}$ denotes the strength of the link between the experts $e_l$ and $e_m$. The degree of the node $e_l$ is given by $d_{(e)l} = \Sigma_m e_{(e)lm}$.

The corresponding adjacency and degree matrices are respectively given by, $W_{(e)}=\{w_{(e)lm}\}$, and $D_{(e)}=\text{diag}(\{d_{(e)l}\})$.

For the bipartite graph between experts and skills, $w_{(es)ln}$ denotes the strength of link between the expert $e_l$ and the skill $s_n$. The degree of the nodes $e_l$ and $s_n$ are respectively given by $d_{(es)l}=\Sigma_n w_{(e)ln}$, and $d_{(es)n}=\Sigma_l w_{(es)ln}$. The prior probability that $e_l$ will have a link is given by $p_{(e)l}=(d_{(es)l})/N$, and a similar prior probability for $s_n$ is given by $p_{(s)n}=(d_{(es)n})/L$.

Furthermore, since there are multiple contexts, which are denoted by the index c, one can denote the probability that $e_l$ and $s_n$ belong to the same co-cluster within the context c as $h^{(c)}_{(es)ln}$. The probability that $e_l$ and $e_m$ belong to the same co-cluster, given that $e_m$ and $s_n$ belong to that co-cluster is denoted as $h^{(c)}_{(e)lm|n}$.

The steady state distributions of the unipartite graphs can be obtained using the RWR procedure described in Section 3.1 of Wang et al. (Jun Wang, Kush R. Varshney, and Aleksandra Mojsilovic. "Legislative prediction via random walks over a heterogeneous graph." In Society for Industrial and Applied Mathematics. Proceedings of the SIAM International Conference on Data Mining. Society for Industrial and Applied Mathematics, 2012). The context specific transition probabilities of the bipartite graphs are estimated using the equation shown in FIG. 10A, where the first part of the equation indicates transition through expert relevance and the second part describes the transition through skill relevance. $0 \leq \gamma \leq 1$ is the probability that the random walker will take the first transition path. This is used with the Algorithm 1 in Wang et al. to update the context specific transition probabilities. Note that instead of transition probabilities specific to 'yea' and 'nay' links as in Wang et al., the transition probabilities are those specific to multiple contexts.

4E. Link prediction is performed for each context by dynamically adding edges at block 118. The overall skills predictions, analyses and inferences 120 are arrived at by merging the contexts 122 and suitably weighting the links of each context using an information theoretic criterion.

In order to merge the context specific probabilities to infer a link, the mutual information $I(e_l, s_n)$ is computed as shown in FIG. 10B, and a new link between l* and n* is added after estimating them as shown in the expression of FIG. 10C.

To summarize, in the area of expertise management, and given an employee-skill matrix, clustering can be performed at the employee level or at the skill level. However, if additional contextual information is provided, i.e., if a set of employees worked together (collaborated) on a product or project using a set of their skills this collaboration can be used to define a co-cluster of those employees and skills. In some cases the co-cluster is explicitly specified, such as when the set of employees collaborate using their respective skill(s). In other cases, however, the co-clustering information is not directly specified. For example, one may have a group of employees that collaborate using their skills to write a number of papers. In this case, and for each employee-skill pair, one can derive a number that specifies how much of a particular skill was used by an employee to write the papers. This defines a new employee-skill matrix which can be simultaneously clustered along rows and columns to obtain co-clusters.

With regard to co-clustering, if one assumes a set of m rows in n columns (an m×n matrix) a co-clustering algorithm generates co-clusters, i.e., a subset of rows which exhibit similar behavior across a subset of columns, or vice versa. There are a number of techniques available to perform co-clustering. For example, reference can be made to: Dhillon, Inderjit S. "Co-clustering documents and words using bipartite spectral graph partitioning." In Proceedings of the seventh ACM SIGKDD international conference on Knowledge discovery and data mining, pp. 269-274. ACM, 2001. Reference in this regard can also be made to: Banerjee, Arindam, Inderjit Dhillon, Joydeep Ghosh, Srujana Merugu, and Dharmendra S. Modha. "A generalized maximum entropy approach to bregman co-clustering and matrix approximation." In Proceedings of the tenth ACM SIGKDD International Conference on Knowledge Discovery and Data Mining, pp. 509-514. ACM, 2004. Standard software implementations are also available, e.g., "Co-clustering Software (Version 1.1)" available online from the University of Texas (utexas.edu). A standard approach is to minimize an objective function by iterating through the rows and columns of the matrix alternatively to identify an optimal clustering.

The approach of the present invention differs is some respects from the random walk approach described by the above-referenced Wang et al. publication. More specifically, after the co-clusterings are obtained one is left with an employee-skill matrix with possibly several contextual co-associations or co-clusterings overlaid upon the matrix. One can then model the employee and skills separately using undirected unipartite graphs. The relationship between employee and skills are modeled as a directed graph. For each unipartite graph, the steady state distributions are obtained using random walks.

In general, a random walk on a graph is a process that begins at some vertex, and at each time step moves to another vertex. When the graph is unweighted, the vertex the walk moves can be chosen uniformly at random among the neighbors of the present vertex. When the graph is weighted, the walk moves to a neighbor vertex with a probability proportional to the weight of the corresponding edge.

In contrast to the approach of Wang et al. the embodiments of this invention use a weighted two-way random walk, where the weights for each context are obtained using the co-association information. This approach beneficially provides for a higher preference for links among employees and skills belonging to the same co-cluster. The links predicted for each context can then be merged to obtain the final employee-skill links. It can be noted that the approach described by Wang et al. does not incorporate any additional context information and hence implements a single unweighted two-way random walk.

It should also be noted that certain embodiments of this invention could be implemented using Matrix Completion. That is, while it has been described thus far that this invention can be implemented using a graph inference technique, it is also possible to implement this invention by modifying existing matrix completion algorithms (e.g., see: Koren, Yehuda, Robert Bell, and Chris Volinsky. "Matrix factorization techniques for recommender systems." Computer 42, no. 8 (2009): 30-37.) In that it can be expected that the employee-skill associations in a co-cluster will be similar to each other, as compared to those in different co-clusters, it becomes possible to introduce a suitable weighting in matrix factorization and completion algorithms to improve the performance of the expertise assessment system.

Reference in this regard can be made to: Kush R. Varshney, Jun Wang, Aleksandra Mojsilovic, Dongping Fang, and John H. Bauer. "Predicting and recommending skills in the social enterprise." In Proc. Int. AAAI Conf. Weblogs Soc. Med. 2013 (referred to hereafter as Varshney et al.). This paper discusses the need for accurate skills assessments of employees in large, global, client-facing enterprises and the shortcomings of existing systems for obtaining and managing expertise. Varshney et al. describe that enterprise and social data can be mined to improve skill assessment processes and propose a matrix completion approach with side information for improved skill assessment prediction and recommendation. The various use cases found in Varshney et al., i.e., expertise assessment, expertise endorsement, skill inventories, taxonomy management and emerging skills, and finding experts, are all applicable to the embodiments of this invention that instead use the weighted two-way random walk, where the weights for each context are obtained using co-association information.

As an overview of the Matrix Completion approach, and as was noted above, the matrix completion algorithm reported in Koren et al.: Koren, Yehuda, Robert Bell, and Chris Volinsky. "Matrix factorization techniques for recommender systems", can be modified appropriately to include context specific weights. Denoting the factor for the expert $e_i$ as $a_l$ and the skill $s_n$ as $s_{n'}$, the context-specific factors can be obtained as shown in the equation of FIG. 10D, where $w_{(es)ln}$ denotes the strength of link between the expert $e_l$ and the skill $s_n$, and $\lambda$ is the regularization factor. The final strength for unknown links is computed using the equation shown in FIG. 10E, where $r^{(e)}$ denotes the priority of each context.

It can be noted that the expert and skill unipartite graphs are not required to perform the matrix completion embodiment of this invention. Instead the context specific expert-skill ratings are directly obtained using matrix completion.

Figure 6:
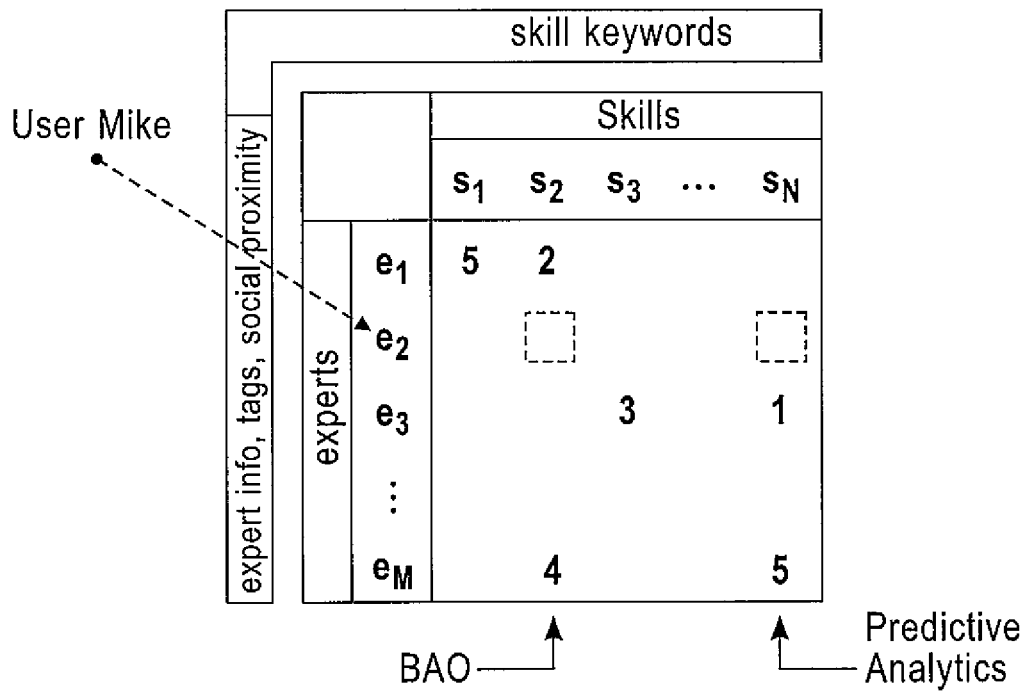
FIG. 6 illustrates a first use case example related to expertise assessment.

FIG. 6 illustrates a first use case example related to expertise assessment. User $e_2$, Mike, logs into a company Intranet. The skills assessment algorithm estimates that there are two skills that Mike might have but has not assessed (based on Mike's profile, activities, other skills). The system can generate the following message: "Mike, have you considered adding BAO and Predictive Analytics to your Business Card or profile?"

Figure 7:
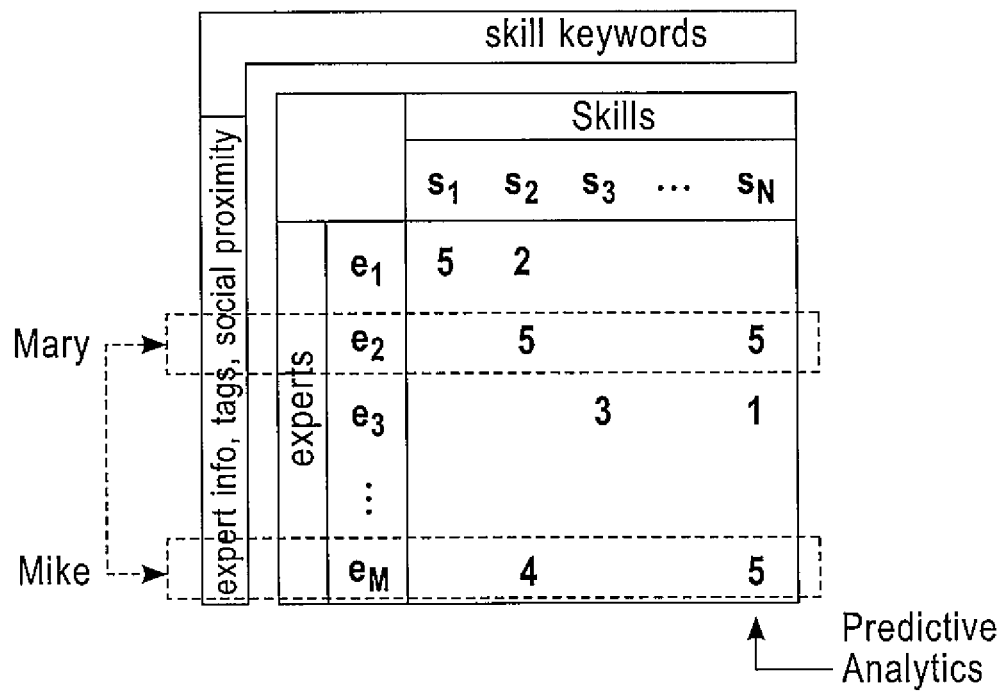
FIG. 7 illustrates a second use case example related to expertise endorsement.

FIG. 7 illustrates a second use case example related to expertise endorsement. User $e_M$, Mike, logs into an organizational social network. The algorithm estimates that Mike looks very similar to user $e_2$, Mary, (they have similar expertise profiles and are connected to each other, i.e., are in close social proximity). Both Mike and Mary are experts on Predictive Analytics. The system in this case can automatically generate the following message: "Mike, would you like to endorse Mary for her Predictive Analytics expertise?" Note that in this case the endorsement can be made with some certain credibility, since the system has established Mike's credentials as having a set of skills that includes Predictive Analytics.

Figure 8:
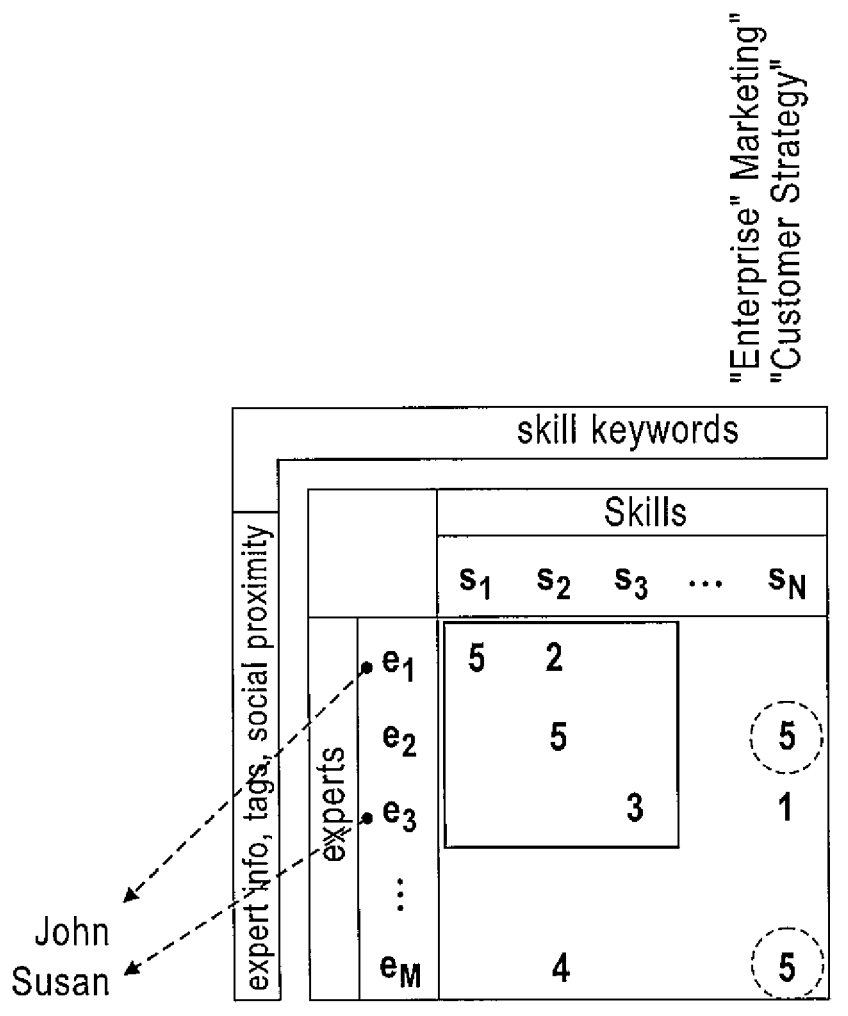

FIG. 8 illustrates a third use case example related to finding experts based on expertise area, keyword or topic with context filtering. Assume that a user, e.g., a client executive, is looking for experts on "Enterprise Marketing" and "Customer Strategy" in Europe, who also worked on a certain product (P). The user types in (or selects) these key words and context, and filters based on region (Europe). The algorithm identifies all relevant personnel located in Europe who have skills related to Enterprise Marketing and Customer Strategy, and who also worked on the product P, and reports the results back to the user. In this example the algorithm has identified John and Susan out of potentially thousands of personnel as matching the query criteria.

A further use case example relates to performing an expert search using natural key words with context augmentation. In this example the algorithm constructs a context-aware mapping from expertise areas to key words to skills. In operation expertise areas are defined (e.g., Cloud) and relevant keywords (e.g. "cloud analytics", "virtual machine migration") are extracted from enterprise documents (e.g., from web pages, white papers, brochures and other marketing materials). A record is also made of key contexts (e.g., products, industry, etc.). The natural search key words are first mapped to skills, and then the relevant experts are recommended based on their predicted skill levels. The additional context information can also be displayed to a user.

Figure 9:
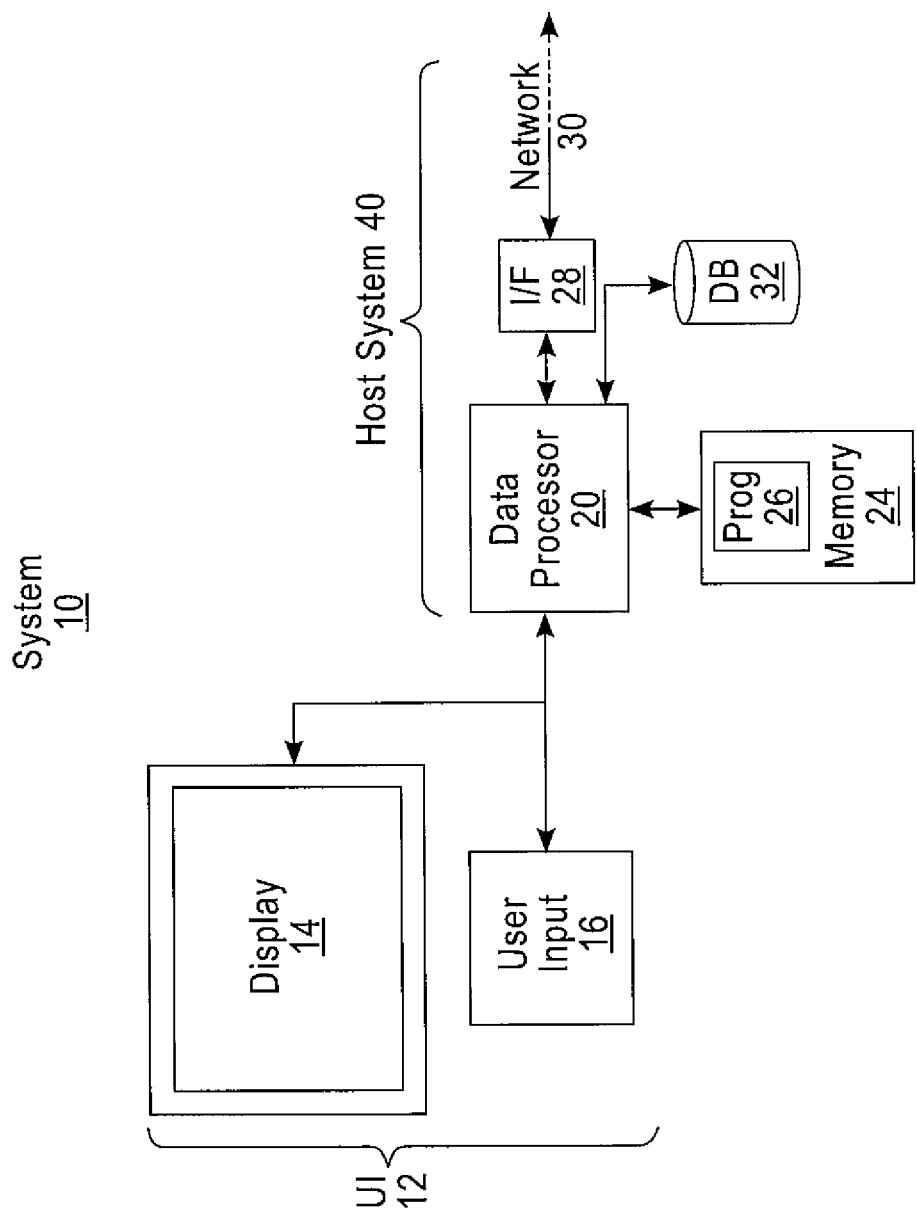
FIG. 9 is a simplified block diagram of a system that is suitable for implementing the various examples of embodiments of this invention.

Referring to FIG. 9 there is shown a simplified block diagram of a system 10 that is suitable for implementing the various examples of embodiments of this invention. The system 100 shown in FIG. 5 can be assumed to be one exemplary embodiment of the system 10.

The system 10 can be associated with an enterprise and can include a user interface 12 implemented using a display 14, such as a plasma display, or an LCD, or a CRT display as examples, and a user input device 16 such as a keypad, keyboard, touch sensitive surface (that could be integrated with the display 14), and/or a voice recognition or other type of biometric input.

A host system 40 can be embodied by one or more mobile devices and/or PCs and/or work stations and/or mainframes. The host system 40 can thus include at least one data processor 20 connected with a memory 24 that stores data and at least one program 26 that is configured so as to implement the embodiments of this invention, such as the embodiments depicted in FIGS. 4 and 5. The memory 24 can be implemented using any suitable type of data storage and retrieval devices including semiconductor-based memory devices and/or disk-based memory devices. Connected with the data processor 20 is at least one interface (I/F) 28 for connecting to a network 30, such as a local area network (LAN), a wireless LAN (WLAN), and/or a wide area network (WAN) such as the Internet. Through the network 30 one or more social networks can be accessed and web pages can be retrieved. In some embodiments the system 40 can host a web site that is associated with the enterprise. In some embodiments queries, such as those discussed above, can be received by the program 26 through the network 30 and the queries can be responded to by the program 26 through the network 30.

At least one local or remote database (DB) 32 can be included and connected with the data processor 20. The DB 32 can be under the control of the enterprise and stores enterprise data, for example, HR data related to employees, papers and publications authored by employees, marketing data including brochures and the like that are descriptive of a product or products or a service or services provided by the enterprise, taxonomical classification data, folksonomical data and, in general, any type of data generated by and/or needed by the enterprise. At least some of this data is considered by the program 26 during the execution of methods in accordance with the invention.

Based on the foregoing discussion it can be appreciated that the embodiments of this invention provide in one aspect thereof a method for leveraging multiple data sources to provide more efficient and robust predictive models for skill assessment and predictions. The method converts enterprise data into knowledge graphs to represent the expert-skill grouping information. The method can also integrate intranet social media information of an enterprise to provide social context aware skill predictive modeling. The method can incorporate contextual information such as products, industry and white papers to co-associate experts and skills. The skill assessment prediction method is based at least in part on multiple machine learning and data mining techniques, including graph inference and co-clustering. The skill assessment prediction method can be based at least in part also on matrix completion methodologies. The generated prediction results provide both macro level and micro level insight for human capital management and decision support. The skill prediction results can be aligned to various use cases, such as skill matching, new skill recommendation, and expert localization.

The embodiments of this invention go beyond the use of a simple predictive model that predicts the skills that an employee may acquire in the future, given a current skill set and skill set enhancers. The embodiments of this invention leverage multiple data sources such as enterprise, social and conventional HR data to understand, recommend, and analyze employee expertise. Data from multiple contexts can be applied, such as products, white papers, etc., in order to provide prediction and inference of expertise at various levels.

The embodiments of this invention use social network data and organizational management data (such as expertise databases, organizational structures, etc.) in addition to enterprise data such as white papers, products and applications which link employees and skills through co-clustering. Furthermore, the embodiments of this invention perform not only expertise assessments and recommendations, which can at least indirectly aid an enterprise in resource management, but also perform other inferences at multiple levels of hierarchy. This can imply, for example, finding an expert in a given area for answering complicated such as providing a shortlist of people to head a team, and who have expertise in several products along with good customer interfacing experience. The embodiments incorporate robust mathematical formulations that rely on novel machine learning and data mining algorithms.

The embodiments of this invention provide a framework that incorporates expertise assessment, recommendation and management using multiple sources of organizational data such as internal social networks, social tags, skills assessed, organizational taxonomy and human resource data, and employ random walks on a bipartite graph that is weighted using enterprise data such as collaborations on products, technical documents, etc. The embodiments provide expertise management through the use of varied data sources such as organizational social networks, user and skill tags, product information and HR data in a machine learning/data mining framework to perform prediction, assessment and management of expertise. The embodiments can use employee skills organized in any manner (e.g., hierarchical, non-hierarchical, hybrid) in the expertise management framework. The embodiments of this invention fuse information from multiple organizational data sources and social networks to manage the expertise of persons in an organization through the use of bipartite graph traversal.

The embodiments of this invention do not rely simply on documents and can be used to answer questions with varying levels of complexity about the expertise in an organization through the use of random walks on bipartite graphs. When associating persons and skills using document information, we use a co-clustering approach rather than probabilistic generative models.

Methods in accordance with embodiments of this invention can use context-specific weights obtained from co-association information in a matrix completion procedure, and merge the context-specific outputs to obtain overall skills predictions, analyses and inferences.

The embodiments of this invention thus also provide a method implemented at least partially using a computer such as the at least one data processor 20. The method includes steps of performing contextual association of entities using multi-source data and, for each context, performing co-clustering to identify distinct expert-skill associations. The method further includes performing a matrix completion procedure where weights for each context are obtained using co-association information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for calving out operations of the present invention maybe assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent mathematical expressions, graph constructions and graph traversal techniques may be used by those skilled in the art. However, all such and similar modifications of the teachings of this invention will still fall within the scope of this invention.

What is claimed is:

1. A method implemented at least partially using a computer, comprising:
    receiving multi-source data from a plurality of sources comprising a plurality of contexts;
    performing contextual association of entities using the multi-source data by performing co-clustering to identify distinct expert-skill associations for each context;
    constructing single-entity unipartite graph representations of each entity and performing a random walk within each single-entity unipartite graph;
    for each single-entity unipartite graph, obtaining steady state distributions using the random walks to obtain clusters of experts and skills;
    performing a weighted two-way random walk across edges of the single-entity unipartite graphs, giving preference to traversal within members of the same co-cluster, wherein weights for each context are obtained using co-association information based on the traversal preference; and
    performing link prediction for each context by dynamically adding edges, and obtaining overall skills predictions, analyses, and inferences by merging the contexts and weighting the links of each context.

2. The method of claim 1, where the multi-source data is comprised of at least one of taxonomical classification data, folksonomical data, and data relating to publications and collaborations of employees.

3. The method of claim 1, where constructing single-entity unipartite graph representations comprises modeling expert similarity and skill similarity as unipartite graphs where nodes denote experts or skills and edges denote respective relations between the nodes.

4. The method of claim 3, where a relation between experts and skills is modeled as a directed graph and the method performs predictive and descriptive analysis via the random walk over heterogeneous graphs augmented with the co-association information between the nodes.

5. The method of claim 3, further comprising incorporating contextual information to co-associate experts and skills.

6. The method of claim 1, where link weights denote similarities between experts or skills.

7. The method of claim 6, where the weighted two-way random walk is performed by computing context-specific link weights that are preferential for experts or skills belonging to a same co-cluster, and where during the weighted two-way random walk the computed link weights are used to increase the strength of a link between two nodes in the unipartite graph.

8. A computer program product comprised of software instructions on a non-transitory computer-readable medium, where execution of the software instructions using a computer results in performing operations comprising:
receiving multi-source data from a plurality of sources comprising a plurality of contexts;
performing contextual association of entities using the multi-source data by performing co-clustering to identify distinct expert-skill associations for each context;
constructing single-entity unipartite graph representations of each entity and performing a random walk within each single-entity unipartite graph;
for each single-entity unipartite graph, obtaining steady state distributions using the random walks to obtain clusters of experts and skills;
performing a weighted two-way random walk across graphs edges of the single-entity unipartite graphs, giving preference to traversal within members of the same co-cluster, wherein weights for each context are obtained using co-association information based on the traversal preference; and
performing link prediction for each context by dynamically adding edges, and obtaining overall skills predictions, analyses, and inferences by merging the contexts and weighting the links of each context.

9. The computer program product of claim 8, where the multi-source data is comprised of at least one of taxonomical classification data, folksonomical data, and data relating to publications and collaborations of employees.

10. The computer program product of claim 8, where constructing single-entity unipartite graph representations comprises modeling expert similarity and skill similarity as unipartite graphs where nodes denote experts or skills and edges denote respective relations between the nodes.

11. The computer program product of claim 10, where a relation between experts and skills is modeled as a directed graph and the method performs predictive and descriptive analysis via the random walk over heterogeneous graphs augmented with the co-association information between the nodes.

12. The computer program product of claim 10, further comprising an operation of incorporating contextual information to co-associate experts and skills.

13. The computer program product of claim 8, where link weights denote similarities between experts or skills.

14. The computer program product of claim 13, where the weighted two-way random walk is performed by computing context-specific link weights that are preferential for experts or skills belonging to a same co-cluster, and where during the weighted two-way random walk the computed link weights are used to increase the strength of a link between two nodes in the unipartite graph.

15. A system, comprised of at least one data processor connected with at least one memory that stores software instructions, where execution of the software instructions by the at least one data processor causes the system to
receive multi-source data from a plurality of sources comprising a plurality of contexts;
perform contextual association of entities using the multi-source data by performing co-clustering to identify distinct expert-skill associations;
construct single-entity unipartite graph representations of each entity and perform a random walk within each single-entity unipartite graph;
for each single-entity unipartite graph, obtain steady state distributions using the random walks to obtain clusters of experts and skills;
perform a weighted two-way random walk across edges of the single-entity unipartite graphs, giving preference to traversal within members of the same co-cluster, wherein weights for each context are obtained using co-association information based on the traversal preference; and
perform link prediction for each context by dynamically adding edges, and obtain overall skills predictions, analyses, and inferences by merging the contexts and weighting the links of each context.

16. The system of claim 15, where the multi-source data is comprised of at least one of taxonomical classification data, folksonomical data, and data relating to publications and collaborations of employees, and where at least some of the multi-source data is stored in at least one data base connected with the at least one data processor.

17. The system of claim 15, where constructing single-entity unipartite graph representations comprises modeling expert similarity and skill similarity as unipartite graphs where nodes denote experts or skills and edges denote respective relations between the nodes.

18. The system of claim 17, where a relation between experts and skills is modeled as a directed graph and the method performs predictive and descriptive analysis via the random walk over heterogeneous graphs augmented with the co-association information between the nodes.

19. The system of claim 17, where execution of the software instructions by the at least one data processor further causes the system to incorporate contextual information to co-associate experts and skills.

20. The system of claim 15, where link weights denote similarities between experts or skills.

21. The system of claim 20, where the weighted two-way random walk is performed by computing context-specific link weights that are preferential for experts or skills belonging to a same co-cluster, and where during the weighted two-way random walk the computed link weights are used to increase the strength of a link between two nodes in the unipartite graph.

* * * * *